US010818169B1

(12) United States Patent
Ribeiro

(10) Patent No.: US 10,818,169 B1
(45) Date of Patent: Oct. 27, 2020

(54) VEHICULAR SPEED DETECTION AND WARNING SYSTEM

(71) Applicant: Antonio Ribeiro, Bay Shore, NY (US)

(72) Inventor: Antonio Ribeiro, Bay Shore, NY (US)

( * ) Notice: Subject to any disclaimer, the term of this patent is extended or adjusted under 35 U.S.C. 154(b) by 0 days.

(21) Appl. No.: 16/430,526

(22) Filed: Jun. 4, 2019

(51) Int. Cl.

| | |
|---|---|
| ***B60K 31/00*** | (2006.01) |
| ***G08G 1/054*** | (2006.01) |
| ***G08G 1/04*** | (2006.01) |
| ***G08G 1/0967*** | (2006.01) |
| ***G08G 1/08*** | (2006.01) |

(52) U.S. Cl.
CPC ............... *G08G 1/054* (2013.01); *G08G 1/04* (2013.01); *G08G 1/08* (2013.01); *G08G 1/0967* (2013.01)

(58) Field of Classification Search
CPC ........ G08G 1/054; G08G 1/0967; G08G 1/04; G08G 1/08
See application file for complete search history.

(56) References Cited

U.S. PATENT DOCUMENTS 6,864,784 B1 * 3/2005 Loeb ................ G08G 1/096716 180/171
7,065,432 B2 * 6/2006 Moisel ...................... B60R 1/00 701/1
7,103,460 B1 * 9/2006 Breed ................ B60C 23/0408 701/29.1
7,553,173 B2 * 6/2009 Kowalick ............ H01R 13/443 439/133
8,669,857 B2 3/2014 Sun
8,983,750 B2 3/2015 Maruyama
D727,761 S 4/2015 Akira
9,120,375 B2 * 9/2015 Byun .................... F02D 11/105
9,836,056 B2 * 12/2017 Ansari ............... G06K 9/00805
9,902,401 B2 * 2/2018 Stein ..................... B60W 40/06
9,904,900 B2 * 2/2018 Cao ...................... G06Q 10/083
10,020,995 B2 * 7/2018 Ricci ...................... B60K 35/00
10,137,833 B2 * 11/2018 Park ...................... B60W 50/14
10,507,813 B2 * 12/2019 Zhu ........................ B60T 17/22
10,671,961 B2 * 6/2020 Cao ........................ G06Q 50/30
2007/0152503 A1 * 7/2007 Kowalick .......... H01R 13/6397 307/10.1
2009/0195411 A1 8/2009 Ichihashi
2010/0271196 A1 10/2010 Schmitt
2013/0200991 A1 * 8/2013 Ricci ................... G06F 3/04817 340/4.3
2013/0205026 A1 * 8/2013 Ricci ................... H04L 12/6418 709/225
2014/0309855 A1 * 10/2014 Tran ........................ B60Q 1/38 701/36

(Continued)

*Primary Examiner* — Philip P. Dang

(57) ABSTRACT

The vehicular speed detection and warning system is a traffic safety device. The vehicular speed detection and warning system is configured for use with a vehicle. The vehicular speed detection and warning system is configured for use on a road network. The vehicular speed detection and warning system is configured for use with a road network. The road network further comprises one or more streets, traffic signs, and traffic signals. The control module monitors and logs the compliance of the vehicles with the traffic control information presented by the traffic signs and the traffic signals by capturing images of the traffic signs and the traffic signals and comparing the traffic control instructions provided by the traffic signs and traffic signals with the operating performance of the vehicle.

11 Claims, 5 Drawing Sheets

(56) References Cited

U.S. PATENT DOCUMENTS

| | | | | |
|---|---|---|---|---|
| 2015/0302747 | A1 | 10/2015 | Ro | |
| 2016/0267335 | A1* | 9/2016 | Hampiholi | B60K 28/066 |
| 2017/0078472 | A1* | 3/2017 | Ricci | G06F 11/2038 |
| 2017/0106858 | A1* | 4/2017 | Li | G08B 21/06 |
| 2018/0034912 | A1* | 2/2018 | Binder | H04L 67/12 |
| 2018/0136652 | A1* | 5/2018 | Jiang | G05D 1/0088 |
| 2019/0154439 | A1* | 5/2019 | Binder | G01S 15/08 |
| 2020/0035100 | A1* | 1/2020 | Noda | G01C 21/365 |

* cited by examiner

VEHICULAR SPEED DETECTION AND WARNING SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of signaling and traffic control systems including arrangements for giving variable traffic instructions, more specifically, a system involving the transmission of highway information where the received highway information does not generate an automatic action in the vehicle control. (G08G1/096716)

SUMMARY OF INVENTION

The vehicular speed detection and warning system is a traffic safety device. The vehicular speed detection and warning system is configured for use with a vehicle. The vehicular speed detection and warning system is configured for use on a road network. The vehicle further comprises a vehicle engine control unit (VECU). The vehicle and the VECU are defined elsewhere in this disclosure. The vehicular speed detection and warning system is configured for use with a road network. The road network further comprises one or more streets, a traffic sign, and a traffic signal. The traffic sign is a static image that provides the operator of the vehicle with relevant traffic control information. The traffic signal provides dynamic traffic control information. By dynamic is meant that the informative content of the traffic control information can change. The vehicular speed detection and warning system captures images of the traffic signs and traffic signals. The control module monitors and logs the compliance of the vehicles with the traffic control information presented by the traffic signs and the traffic signals.

The vehicular speed detection and warning system comprises a control module and a housing. The housing contains the control module. The control module controls the operation of the vehicular speed detection and warning system.

The control module processes the captured images through an image processing system. The control module determines the speed of the vehicle. The control module generates and logs an alert when the image processing system determines that the speed of the vehicle is greater than the posted speed limit of the street. The control module generates and logs an alert when the image processing system determines that the vehicle has run a stop sign. The control module generates and logs an alert when the image processing system determines that the vehicle has improperly entered a controlled intersection. By controlled intersection is meant that the intersection of two streets is controlled by a controlling signal selected from the group consisting of a traffic sign and a traffic signal. By improperly entered is meant that the vehicle has entered the controlled intersection in violation of the traffic control information presented by the controlling signal.

These together with additional objects, features and advantages of the vehicular speed detection and warning system will be readily apparent to those of ordinary skill in the art upon reading the following detailed description of the presently preferred, but nonetheless illustrative, embodiments when taken in conjunction with the accompanying drawings.

In this respect, before explaining the current embodiments of the vehicular speed detection and warning system in detail, it is to be understood that the vehicular speed detection and warning system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the vehicular speed detection and warning system.

It is therefore important that the claims be regarded as including such equivalent construction insofar as they do not depart from the spirit and scope of the vehicular speed detection and warning system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
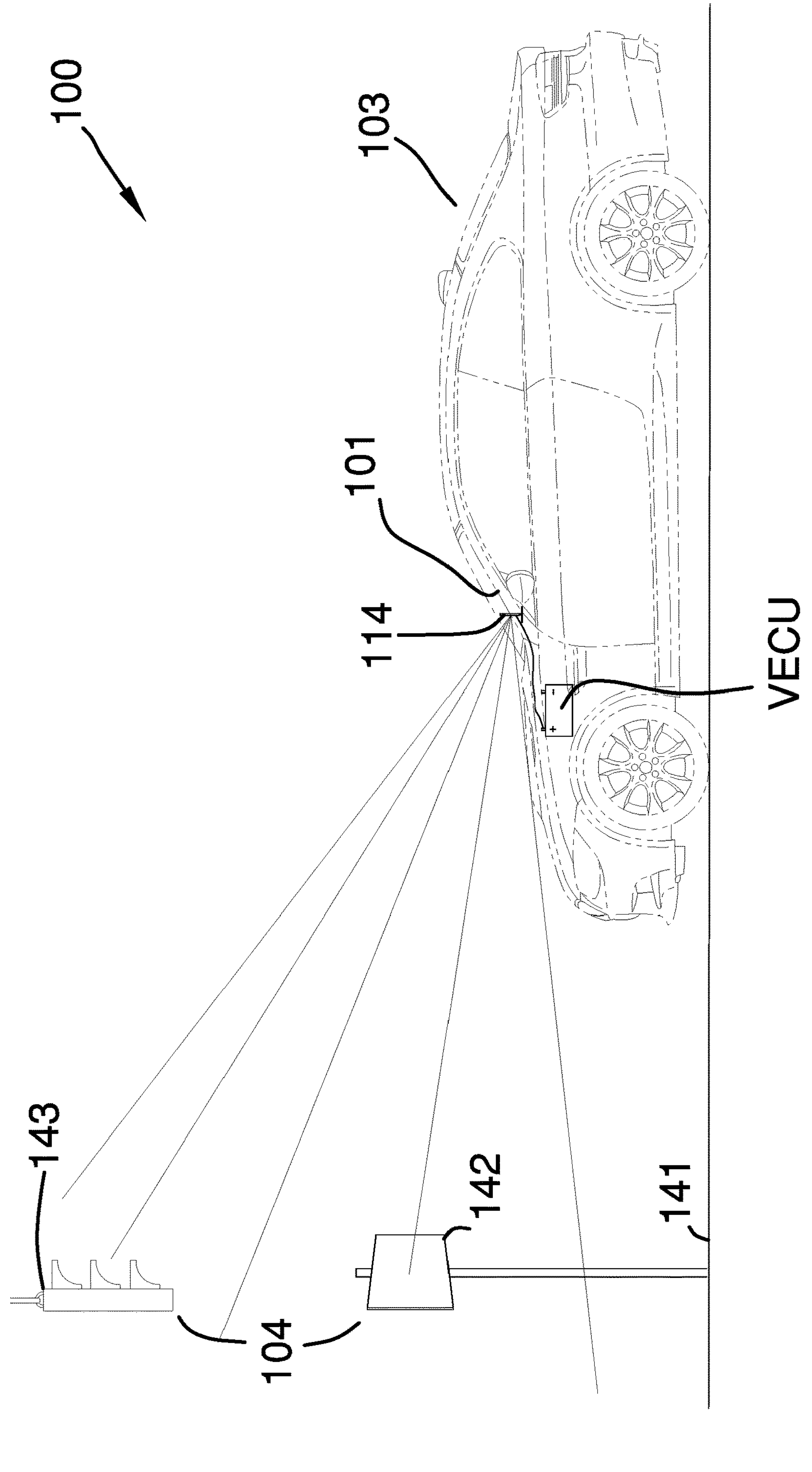
FIG. 1 is an in-use view of an embodiment of the disclosure.
Figure 2:
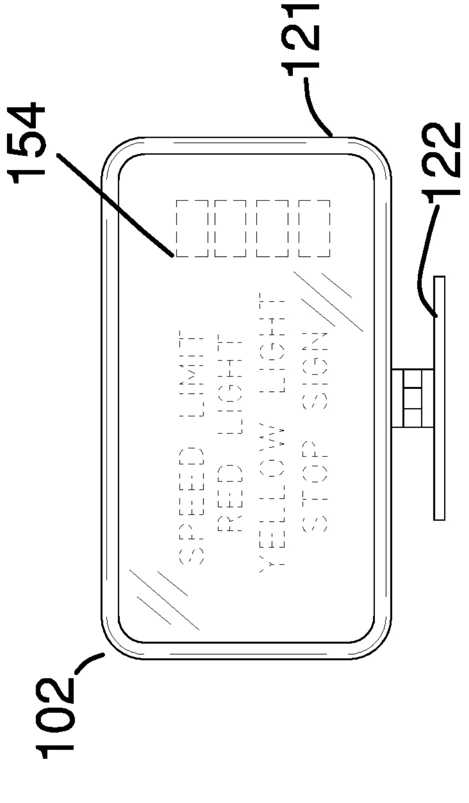
FIG. 2 is a front view of an embodiment of the disclosure.
Figure 3:
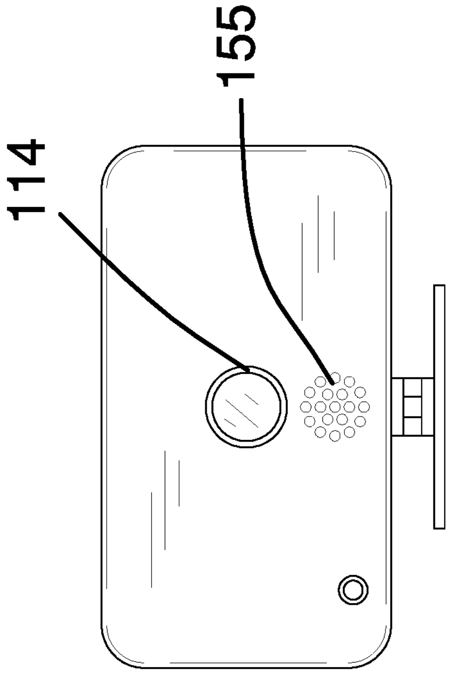
FIG. 3 is a rear view of an embodiment of the disclosure.
Figure 4:
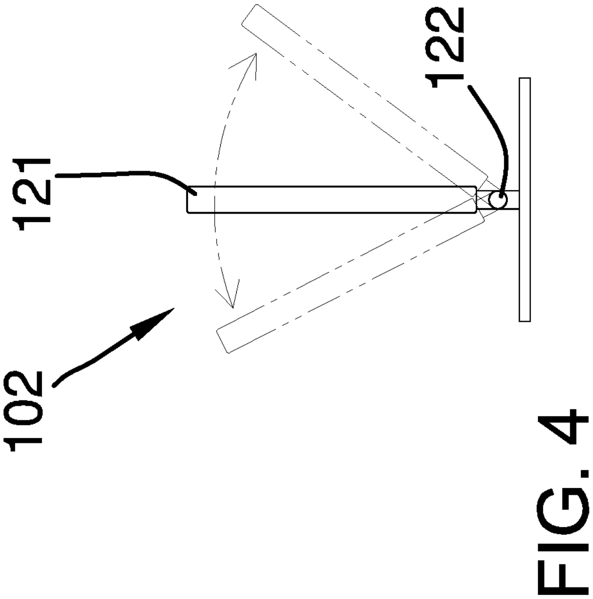
FIG. 4 is a side view of an embodiment of the disclosure.
Figure 5:
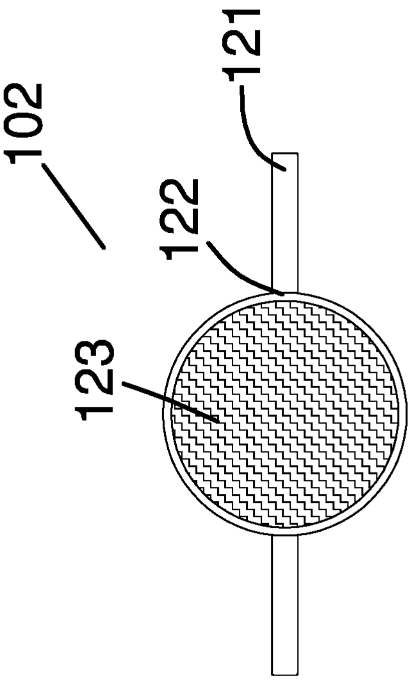
FIG. 5 is a bottom view of an embodiment of the disclosure.
Figure 6:
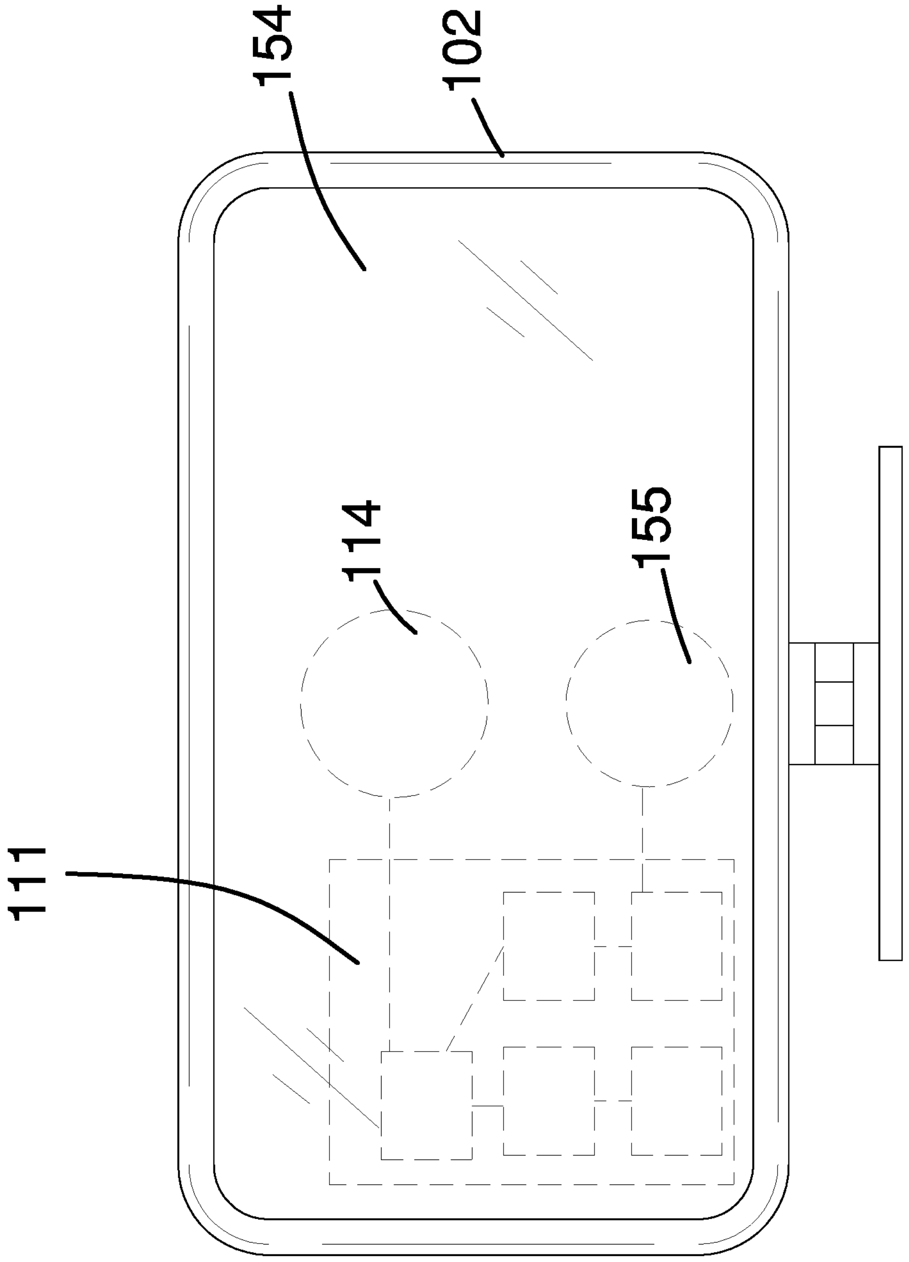
FIG. 6 is a detail view of an embodiment of the disclosure.
Figure 7:
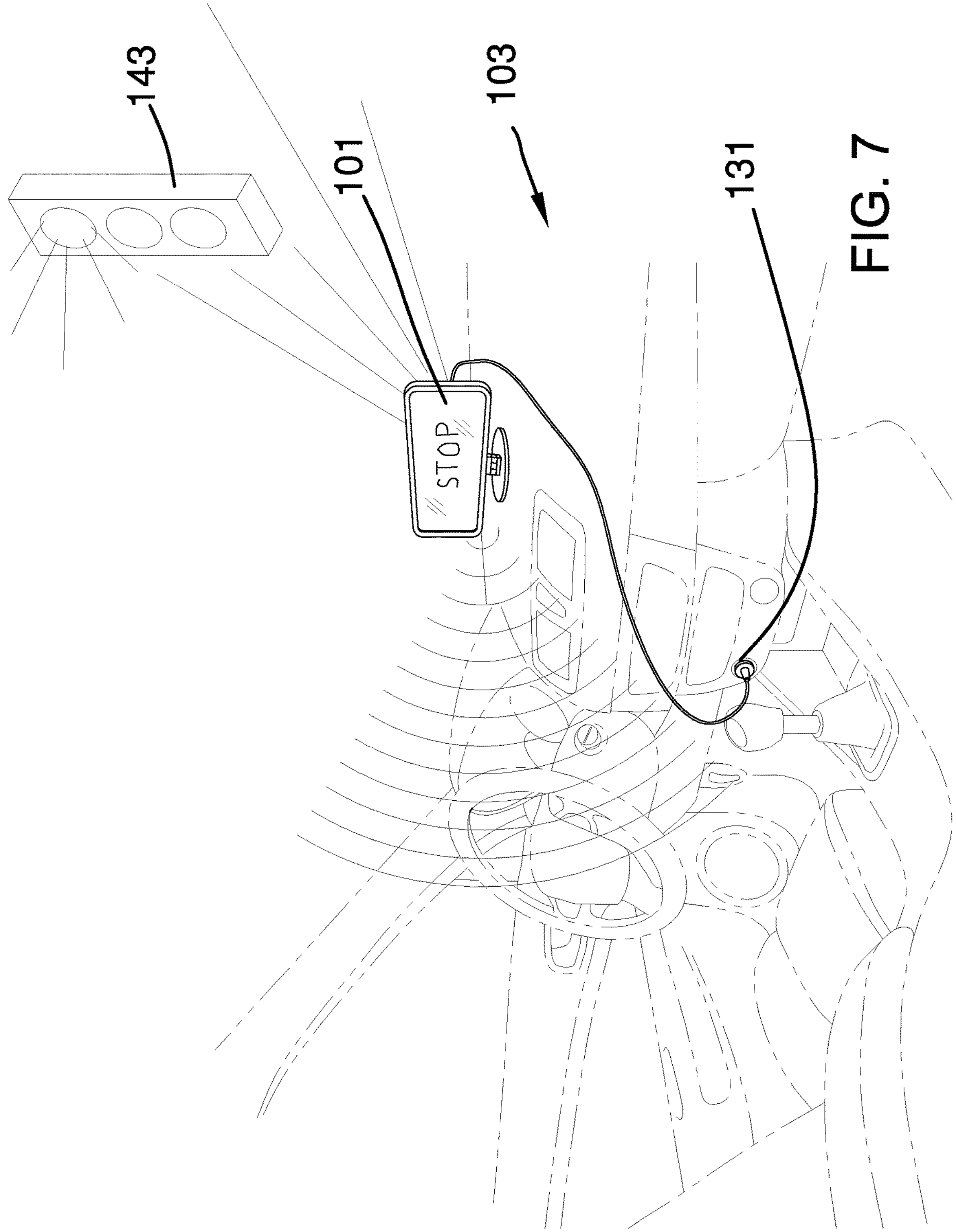
FIG. 7 is an in-use view of an embodiment of the disclosure.
Figure 8:
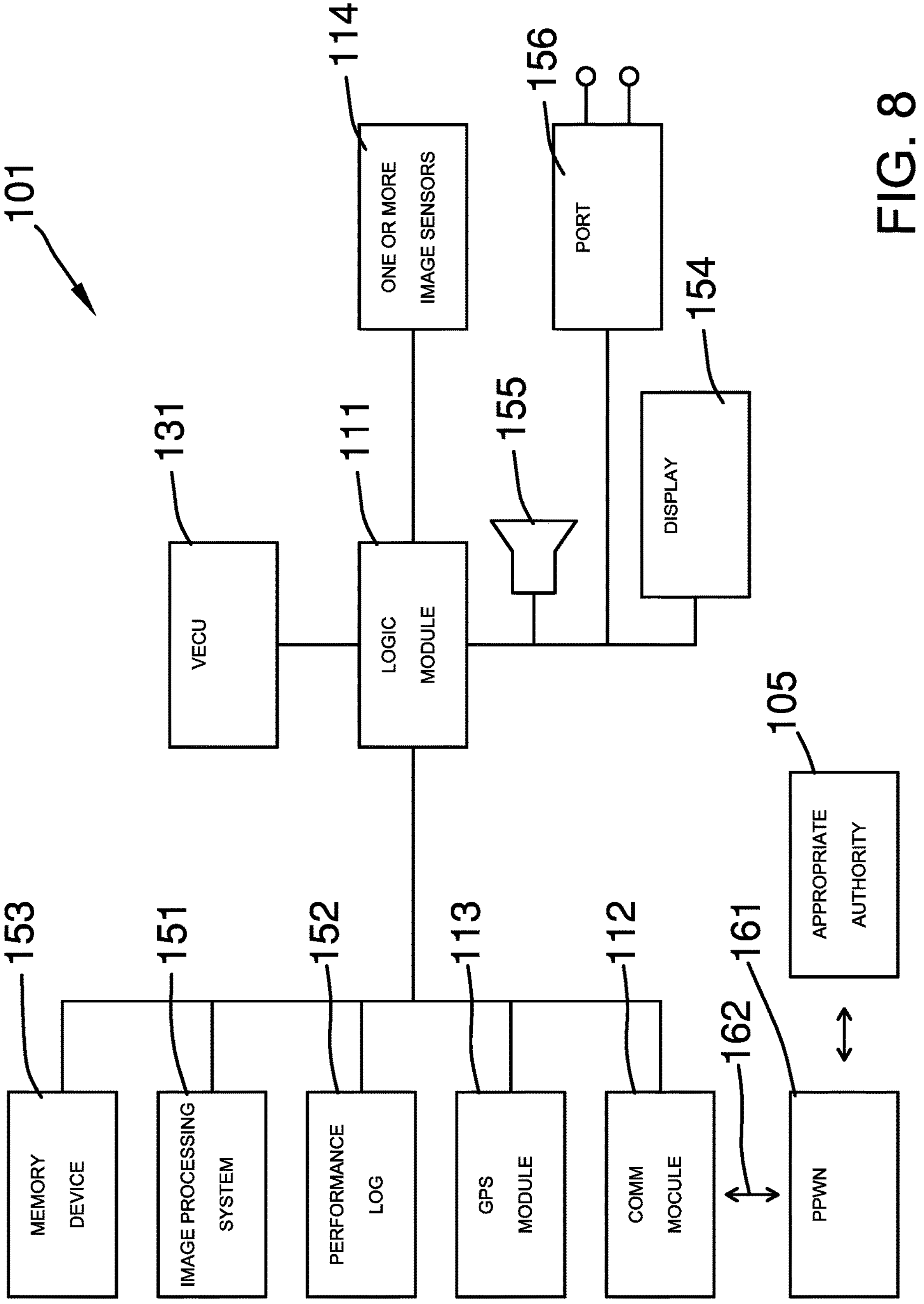
FIG. 8 is a block diagram of an embodiment of the disclosure.

Detailed reference will now be made to one or more potential embodiments of the disclosure, which are illustrated in FIGS. 1 through 8.

The vehicular speed detection and warning system 100 (hereinafter invention) is a traffic safety device. The invention 100 is configured for use with a vehicle 103. The invention 100 is configured for use on a road network 104. The vehicle 103 further comprises a vehicle 103 engine control unit 131 (VECU). The vehicle 103 and the VECU 131 are defined elsewhere in this disclosure. The invention 100 is configured for use with a road network 104. The road network 104 further comprises one or more streets 141, traffic signs 142 and traffic signals 143. The street 141 is a supporting surface on which the vehicle 103 travels. The traffic sign 142 is a static image that provides the operator of the vehicle 103 with relevant traffic control information. The traffic signal 143 provides dynamic traffic control information. By dynamic is meant that the informative content of the traffic control information can change. An intersection refers to a node of the road network 104 created by the crossing of two or more streets 141.

The invention 100 captures images of the traffic signs 142 and traffic signals 143. The invention 100 comprises a control module 101 and a housing 102. The housing 102 contains the control module 101. The control module 101 controls the operation of the invention 100. The control module 101 monitors and logs the compliance of the vehicle 103 with the traffic control information presented by the traffic signs 142 and the traffic signals 143.

The control module 101 processes the captured images through an image processing system 151. The control module 101 determines the speed of the vehicle 103. The control module 101 generates and logs an alert when the image processing system 151 determines that the speed of the vehicle 103 is greater than the posted speed limit of the street 141. The control module 101 generates and logs an alert when the image processing system 151 determines that the vehicle 103 has run a stop sign. The control module 101 generates and logs an alert when the image processing system 151 determines that the vehicle 103 has improperly entered a controlled intersection. By controlled intersection is meant that the intersection of two streets 141 is controlled by a controlling signal selected from the group consisting of a traffic sign 142 and a traffic signal 143. By improperly entered is meant that the vehicle 103 has entered the controlled intersection in violation of the traffic control information presented by the controlling signal.

The housing 102 is a rigid structure. The housing 102 contains the control module 101. The housing 102 is formed with all apertures and form factors necessary to allow the housing 102 to accommodate the use, the operation, and the external connections of the control module 101. Methods to form a housing 102 suitable for the purposes described in this disclosure are well-known and documented in the mechanical arts.

In the second potential embodiment of the disclosure, the housing 102 further comprises a shell 121, a rotating mount 122, and a fastener 123. The shell 121 and the fastener 123 attach to the rotating mount 122. The fastener 123 attaches the housing 102 to the dash of the vehicle 103.

The shell 121 is a rigid structure. The shell 121 contains the control module 101. The shell 121 is formed with all apertures and form factors necessary to allow the shell 121 to accommodate the use and operation of the invention 100. Methods to form a control module 101 suitable for the purposes described in this disclosure are well-known and documented in the mechanical arts.

The rotating mount 122 is a mechanical device that attaches the control module 101 to the vehicle 103. The rotating mount 122 is a rotating device. The rotation of the rotating mount 122 allows the position of the display 154 of the logic module 111 to be adjusted relative to the operator of the vehicle 103. The fastener 123 is a fastening device that secures the rotating mount 122 to the vehicle 103. In the second potential embodiment of the disclosure, the fastener 123 is a hook and loop fastener.

The control module 101 is an electrical circuit. The control module 101 controls the operation of the invention 100. The control module 101 monitors the VECU 131 of the vehicle 103 such that the control module 101 will initiate operation when the VECU 131 indicates that the vehicle 103 has initiated operation. The control module 101 monitors the VECU 131 of the vehicle 103 such that the control module 101 will discontinue operation when the VECU 131 indicates that the vehicle 103 has discontinued operation. The control module 101 captures images of the traffic signs 142 and the traffic signals 143 of the road network 104. The control module 101 processes the captured images of the traffic signs 142 and the traffic signals 143 of the road network 104 to determine the traffic control information presented by the traffic signs 142 and the traffic signals 143 of the road network 104.

The control module 101 monitors compliance of the vehicle 103 with the traffic control information presented by the traffic signs 142 and the traffic signals 143 of the road network 104. The control module 101 tracks the GPS coordinates of the vehicle 103. The control module 101 compares the speed of the vehicle 103 against the speed limit indicated by the traffic signs 142 and the traffic signals 143 of the road network 104.

The control module 101 generates a visual and audible alert within the vehicle 103 when the speed of the vehicle 103 is greater than the posted speed limit indicated by the traffic control information presented by the traffic signs 142 and the traffic signals 143 of the road network 104. The control module 101 records a log entry containing a code indicating that the vehicle 103 was traveling at an improper speed along with the GPS coordinates of where this occurred. The control module 101 saves a video file of the image documenting that the vehicle 103 was traveling at an improper speed. The control module 101 transmits a message documenting the recorded log entry to the appropriate authority 105. The appropriate authority 105 is defined in greater detail elsewhere in this disclosure.

The control module 101 generates a visual and audible alert within the vehicle 103 when the vehicle 103 improperly enters an intersection of two or more streets 141. By improperly entering the intersection is meant that the vehicle 103 entered the intersection in violation of the relevant traffic control information presented by the traffic signs 142 and the traffic signals 143 of the road network 104. The control module 101 records a log entry containing a code indicating that the vehicle 103 improperly entered an intersection along with the GPS coordinates of where this occurred. The control module 101 saves a video file of the image documenting that the vehicle 103 improperly entered the intersection. The control module 101 transmits a message documenting the recorded log entry to the appropriate authority 105.

The control module 101 comprises a logic module 111, a communication module 112, a GPS module 113, and one or more image sensors 114. The logic module 111, the communication module 112, the GPS module 113, and the one or more image sensors 114 are electrically interconnected.

The communication module 112 is a wireless electronic communication device that allows the logic module 111 to wirelessly communicate the logs generated by the control module 101 with an appropriate authority 105. The communication module 112 comprises a commercially provided and publicly available cellular wireless network 161 and a wireless communication link 162. The communication module 112 communicates to the commercially provided and publicly available cellular wireless network 161 using the wireless communication link 162. The communication module 112 communicates the logs generated by the control module 101 as SMS and MMS messages between the logic module 111 and the appropriate authority 105 through a commercially provided and publicly available cellular wireless network 161.

The use of the commercially provided and publicly available cellular wireless network 161 is preferred because: 1) of its low cost; 2) of the widespread availability and the broad interoperability between competing commercially provided and publicly available cellular wireless networks 161; and, 3) methods and techniques to send SMS and MMS messages over a commercially provided and publicly available cellular wireless network 161 are well known and documented by those skilled in the electrical arts.

The GPS module 113 is an electrical device that communicates with the GPS to determine the GPS coordinates of the GPS module 113. When queried by the logic module 111, the GPS module 113 transfers the GPS coordinates to the logic module 111. The GPS module 113 continuously tracks the GPS coordinates and the speed of the vehicle 103 for the logic module 111.

Each of the one or more image sensors 114 is a camera. Each of the one or more image sensors 114 captures images of the road network 104 while the vehicle 103 is in operation. Each of the one or more image sensors 114 is configured for use with the logic module 111. Each of the one or more image sensors 114 image sensor receives light from the exterior of each selected image sensor and converts the received light into a digital representation of sufficient detail to allow the image processing system 151 to create and process a visual reproduction of the source of the captured light.

The logic module 111 is a programmable electrical circuit. The logic module 111 controls the operation of the control module 101.

The logic module 111 monitors the VECU 131 of the vehicle 103 such that the logic module 111 will initiate operation when the VECU 131 indicates that the vehicle 103 has initiated operation. The logic module 111 monitors the VECU 131 of the vehicle 103 such that the control module 101 will discontinue operation when the VECU 131 indicates that the vehicle 103 has discontinued operation.

The logic module 111 receives images of the traffic signs 142 and the traffic signals 143 of the road network 104 from the one or more image sensors 114 to the image processing system 151. The logic module 111 processes the captured images of the traffic signs 142 and the traffic signals 143 of the road network 104 to determine the traffic control information presented by the traffic signs 142 and the traffic signals 143 of the road network 104. The logic module 111 monitors compliance of the vehicle 103 with the traffic control information presented by the traffic signs 142 and the traffic signals 143 of the road network 104. The logic module 111 receives the GPS coordinates and the speed of the vehicle 103 from the GPS module 113.

The logic module 111 compares the speed of the vehicle 103 against the speed limit indicated by the traffic signs 142 and the traffic signals 143 of the road network 104. The logic module 111 generates a visual and audible alert within the vehicle 103 when the speed of the vehicle 103 is greater than the posted speed limit indicated by the traffic control information presented by the traffic signs 142 and the traffic signals 143 of the road network 104. The logic module 111 records a log entry containing a code indicating that the vehicle 103 was traveling at an improper speed along with the GPS coordinates of where this occurred. The logic module 111 saves a video file of the image documenting that the vehicle 103 was traveling at an improper speed. The logic module 111 transmits a message documenting the recorded log entry to the appropriate authority 105 using the communication module 112.

The logic module 111 generates a visual and audible alert within the vehicle 103 when the vehicle 103 improperly enters an intersection of two or more streets 141. By improperly entering the intersection is meant that the vehicle 103 entered the intersection in violation of the relevant traffic control information presented by the traffic signs 142 and the traffic signals 143 of the road network 104. The logic module 111 records a log entry containing a code indicating that the vehicle 103 improperly entered an intersection along with the GPS coordinates of where this occurred. The logic module 111 saves a video file of the image documenting that the vehicle 103 improperly entered the intersection. The control module 101 transmits a message documenting the recorded log entry to the appropriate authority 105 using the communication module 112.

The logic module 111 further comprises an image processing system 151, a performance log 152, a memory device 153, a display 154, a speaker 155, and a port 156.

The image processing system 151 electrically connects to the logic module 111. The logic module 111 controls the operation of the image processing system 151. The performance log 152 electrically connects to the logic module 111. The logic module 111 controls the operation of the performance log 152. The memory device 153 electrically connects to the logic module 111. The logic module 111 controls the operation of the memory device 153. The display 154 electrically connects to the logic module 111. The logic module 111 controls the operation of the display 154. The speaker 155 electrically connects to the logic module 111. The logic module 111 controls the operation of the speaker 155. The port 156 electrically connects to the logic module 111. The logic module 111 controls the operation of the port 156.

The image processing system 151 is an optical data processor. The image processing system 151 receives the images captured by the one or more image sensors 114 from the logic module 111. The image processing system 151 analyses the images received from the logic module 111. The image processing system 151 extracts the relevant traffic control information from the images received from the logic module 111. The image processing system 151 monitors the motion of the vehicle 103 on the road network 104. The image processing system 151 compares the motion of the vehicle 103 on the road network 104 against the relevant traffic control information collected from the traffic signs 142 and the traffic signals 143 of the road network 104.

The image processing system 151 sends a code to the logic module 111 detailing a situation where the motion of the vehicle 103 violates the relevant traffic control information. The image processing system 151 sends a video file to the logic module 111 documenting the situation where the motion of the vehicle 103 violates the relevant traffic control information. The logic module 111 records the received video file in the memory device 153. The performance log 152 is a data management device.

The logic module 111 transmits the code received from the image processing system 151 to the performance log 152 for processing into a message that is sent to the appropriate authority 105 and a log entry that is returned to the logic module 111. The logic module 111 transmits the GPS coordinates of the GPS module 113 to the image processing system 151 for processing into the message and the log entry. The logic module 111 transmits the speed of the vehicle 103 for processing into the message and the log entry.

The memory device 153 is an electrical device. The memory device 153 provides long term storage for the log entry and video file generated by the logic module 111, the image processing system 151, and the performance log 152. The memory device 153 is defined in greater detail elsewhere in this disclosure.

The display 154 is an electrical device. The display 154 forms a visual and tactile interface with the operator of the vehicle 103. The display 154 presents the visual alerts generated by the control module 101. In the first potential embodiment of the disclosure, the display 154 is a touchscreen display 154.

The speaker 155 is an electrical device. The speaker 155 is a transducer that converts electrical signals into audible sounds. The speaker 155 presents the audible alerts generated by the logic module 111.

The port 156 is an electrical device. The forms an electrical interface that allows the logic module 111 to download the log entries and video files stored in the memory device 153 into an external device. In the first potential embodiment of the disclosure, the port 156 is a USB port.

The following definitions were used in this disclosure:

Appropriate Authority: As used in this disclosure, an appropriate authority is a previously determined person or organization that is designated to send and receive alarm or other notification messages regarding a monitored system or activity.

Camera: As used in this disclosure, a camera is a sensor that converts light into electric signals that encode and records the spatial orientation of the captured light in a manner that reproduces the images seen by a human eye.

Commercially Provided And Publicly Available Cellular Wireless Network: As used in this disclosure, a commercially provided and publicly available cellular wireless network refers to subscription-based publically available wireless network commonly used to provide wireless communication access for personal data devices. The commercially provided and publicly available cellular wireless network will typically provide voice communication, data communication services, and SMS and MMS messaging services. The commercially provided and publicly available cellular wireless network is commonly referred to as the cellular network. The commercially provided and publicly available cellular wireless network is abbreviated as the PPWN.

Communication Link: As used in this disclosure, a communication link refers to the structured exchange of data between two objects.

Display: As used in this disclosure, a display is a surface upon which is presented an image, potentially including, but not limited to, graphic images and text, that is interpretable by an individual viewing the projected image in a meaningful manner.

Fastener: As used in this disclosure, a fastener is a device that is used to join or affix a first object to a second object.

Field of View: As used in this disclosure, a field of view refers to one or more angles which delimits an area from which electromagnetic radiation will be sensed by a person or an image sensor.

Form Factor: As used in this disclosure, the term form factor refers to the size and shape of an object.

GPS: As used in this disclosure, and depending on the context, GPS refers to: 1) a system of navigational satellites that are used to determine the position, known as GPS coordinates, and velocity of a person or object; 2) the system of navigational satellites referred to in the first definition that are used to synchronize to global time; or, 3) an electronic device or that uses the system of navigational satellites referred to in the first definition to determine the position of a person or object. GPS is an acronym for Global Positioning System. Methods to determine the distance and direction between any two sets of GPS coordinates are well-known and documented in the navigational arts.

Hook and Loop Fastener: As used in this disclosure, a hook and loop fastener is a fastener that comprises a hook surface and a loop surface. The hook surface comprises a plurality of minute hooks. The loop surface comprises a surface of uncut pile that acts like a plurality of loops. When the hook surface is applied to the loop surface, the plurality of minute hooks fastens to the plurality of loops securely fastening the hook surface to the loop surface. A note on usage: when fastening two objects the hook surface of a hook and loop fastener will be placed on the first object and the matching loop surface of a hook and loop fastener will be placed on the second object without significant regard to which object of the two objects is the first object and which of the two objects is the second object. When the hook surface of a hook and loop fastener or the loop surface of a hook and loop fastener is attached to an object this will simply be referred to as the "hook/loop surface" with the understanding that when the two objects are fastened together one of the two objects will have a hook surface and the remaining object will have the loop surface.

Housing: As used in this disclosure, a housing is a rigid structure that encloses and protects one or more devices.

Image: As used in this disclosure, an image is an optical representation or reproduction of an indicia or of the appearance of something or someone.

Image Sensor: As used in this disclosure, an image sensor receives light from the exterior of the image sensor and converts the received light into a digital representation of sufficient detail to allow a logic module to create and display a visual reproduction of the source of the captured light.

Logic Module: As used in this disclosure, a logic module is a readily and commercially available electrical device that accepts digital and analog inputs, processes the digital and analog inputs according to previously specified logical processes and provides the results of these previously specified logical processes as digital or analog outputs. The disclosure allows, but does not assume, that the logic module is programmable.

Memory Device: As used in this device, a memory device is an electronic device that stores information (including audio and video data) in a digital format. Common memory devices include the RAM (random access memory) and disk drives in a computer, USB (Universal Serial Bus) drives, DVD (Digital Video Disk) formatted video, and SD (secure digital) cards.

Optical Data Processor: As used in this disclosure, an optical data processor refers to a collection of commercially available algorithms that process a digital representation of an image in a manner that allows an electronically operated device, such as a computer, to extract data from the digital representation of the image and take a subsequent action based on the data extracted from the image.

PPWN: As used in this disclosure, the PPWN is an acronym for a publically provided wireless network. The PPWN refers to a commercially provided and publicly available cellular wireless network.

Mount: As used in this disclosure, a mount is a mechanical structure that attaches or incorporates a first object to a second object.

Rigid Structure: As used in this disclosure, a rigid structure is a solid structure formed from an inelastic material that resists changes in shape. A rigid structure will permanently deform as it fails under a force.

Rotation: As used in this disclosure, rotation refers to the cyclic movement of an object around a fixed point or fixed axis. The verb of rotation is to rotate.

Sensor: As used in this disclosure, a sensor is a device that receives and responds in a predetermined way to a signal or stimulus. As further used in this disclosure, a threshold sensor is a sensor that generates a signal that indicates whether the signal or stimulus is above or below a given threshold for the signal or stimulus.

Sign: As used in this disclosure, a sign is a placard that displays an image, potentially including a text-based image, which contains some form of a sentiment.

Shell: As used in this disclosure, a shell is a structure that forms an outer covering intended to contain an object. Shells are often, but not necessarily, rigid or semi-rigid structures that are intended to protect the object contained within it.

SMS: As used in this disclosure, SMS is an abbreviation for short message service. The short message service is a service that is often provided with the cellular services that support personal data devices. Specifically, the SMS allows for the exchange of written messages between personal data devices. The SMS is commonly referred to as text messaging. A common enhancement of SMS is the inclusion of the delivery of multimedia services. This enhanced service is often referred to as Multimedia Media Services which is abbreviated as MMS.

Speaker: As used in this disclosure, a speaker is an electrical transducer that converts an electrical signal into an audible sound.

Touchscreen Display: As used in this disclosure, a touchscreen display is an interface that allows a user to interface with a logical device by touching the image bearing surface of a display.

Transducer: As used in this disclosure, a transducer is a device that converts a physical quantity, such as pressure or brightness into an electrical signal or a device that converts an electrical signal into a physical quantity.

USB: As used in this disclosure, USB is an acronym for Universal Serial Bus which is an industry standard that defines the cables, the connectors, the communication protocols and the distribution of power required for interconnections between electronic devices. The USB standard defines several connectors including, but not limited to, USB-A, USB-B, mini-USB, and micro USB connectors. A USB cable refers to a cable that: 1) is terminated with USB connectors; and, 2) that meets the data transmission standards of the USB standard.

VECU: As used in this disclosure, the VECU is an acronym for the Vehicle Engine Control Unit of the vehicle. The VECU is an electronic device that controls the operation of all electrical subsystems within a vehicle.

Vehicle: As used in this disclosure, a vehicle is a motorized device used for transporting passengers, goods, or equipment. The term motorized vehicle refers to a vehicle can move under power provided by an electric motor or an internal combustion engine.

Video: As used in this disclosure, video refers to the display of: a) an image; or, b) a plurality of images in a manner that simulates the perception of motion for a person viewing the video. This disclosure assumes that a video device can further incorporate sounds associated with the generated images.

Video Device: As used in this disclosure, a video device is a device that generates an image on a display. The image may be a still or moving image.

Video File: As used in this disclosure, a video file is a digital representation of an image and associated audible sounds to store an image. Separate hardware is used to convert the digital representation of the sound into an audible sound.

Wireless: As used in this disclosure, wireless is an adjective that is used to describe a communication channel between two devices that does not require the use of physical cabling.

With respect to the above description, it is to be realized that the optimum dimensional relationship for the various components of the invention described above and in FIGS. 1 through 8 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A vehicular speed detection and warning system comprising a control module and a housing;

wherein the housing contains the control module; wherein the control module controls an operation of the vehicular speed detection and warning system;

wherein the housing is a rigid structure;

wherein the vehicular speed detection and warning system is a traffic safety device;

wherein the vehicular speed detection and warning system is configured for use with a vehicle;

wherein the vehicular speed detection and warning system is configured for use on a road network;

wherein the control module monitors and logs a compliance of the vehicle with a traffic control information presented by traffic signs and traffic signals;

wherein the control module comprises a logic module, a communication module, a GPS module, and one or more image sensors;

wherein the logic module, the communication module, the GPS module, and the one or more image sensors are electrically interconnected;

wherein the logic module further comprises an image processing system, a performance log, a memory device, a display, a speaker, and a port;

wherein the image processing system electrically connects to the logic module;

wherein the performance log electrically connects to the logic module;

wherein the memory device electrically connects to the logic module;

wherein the display electrically connects to the logic module;

wherein the speaker electrically connects to the logic module;

wherein the port electrically connects to the logic module;

wherein the logic module controls an operation of the image processing system;

wherein the logic module controls an operation of the performance log;

wherein the logic module controls an operation of the memory device;

wherein the logic module controls an operation of the display;

wherein the logic module controls an operation of the speaker;

wherein the logic module controls an operation of the port;

wherein the image processing system is an optical data processor;

wherein the image processing system receives the images captured by the one or more image sensors from the logic module;

wherein the image processing system analyzes the images received from the logic module;

wherein the image processing system extracts the relevant traffic control information from the images received from the logic module;

wherein the image processing system monitors a motion of the vehicle on the road network;

wherein the image processing system compares the motion of the vehicle on the road network against the relevant traffic control information collected from the traffic signs and the traffic signals of the road network;

wherein the image processing system sends a code to the logic module detailing a situation where the motion of the vehicle violates the relevant traffic control information;

wherein the image processing system sends a video file to the logic module documenting the situation where the motion of the vehicle violates the relevant traffic control information;

wherein the logic module records the received video file in the memory device;

wherein the vehicle further comprises a vehicle engine control unit (VECU);

wherein the road network further comprises one or more streets, traffic signs and traffic signals;

wherein the control module is an electrical circuit;

wherein the control module monitors the VECU of the vehicle such that the control module will initiate an operation of the logic module when the VECU indicates that the vehicle has initiated an operation of the vehicle;

wherein the control module monitors the VECU of the vehicle such that the control module will discontinue the operation of the logic module when the VECU indicates that the vehicle has discontinued the operation of the vehicle;

wherein the control module captures images of the traffic signs and the traffic signals of the road network;

wherein the control module processes the captured images of the traffic signs and the traffic signals of the road network to determine the traffic control information presented by the traffic signs and the traffic signals of the road network;

wherein the control module monitors compliance of the vehicle with the traffic control information resented by the traffic signs and the traffic signals of the road network;

wherein the control module tracks GPS coordinates of the vehicle;

wherein the control module compares a speed of the vehicle against a speed limit indicated by the traffic signs and the traffic signals of the road network;

wherein the control module generates a visual and audible alert within the vehicle when the seed of the vehicle is greater than a posted speed limit indicated by the traffic control information presented by the traffic signs and the traffic signals of the road network;

wherein the control module records a log entry containing a code indicating that the vehicle was traveling at an improper speed along with the GPS coordinates of where this violation occurred;

wherein the control module saves a video file of an image documenting that the vehicle was traveling at the improper speed;

wherein the control module transmits a message documenting a recorded log entry to an appropriate authority;

wherein the control module generates the visual and audible alert within the vehicle when the vehicle improperly enters an intersection of two or more streets;

wherein by improperly entering the intersection is meant that the vehicle entered the intersection in violation of a relevant traffic control information presented by the traffic signs and the traffic signals of the road network;

wherein the control module records a log entry containing a code indicating that the vehicle improperly entered an intersection along with the GPS coordinates of where this violation occurred;

wherein the control module saves a video file of the image documenting that the vehicle improperly entered the intersection.

2. The vehicular speed detection and warning system according to claim 1 wherein the communication module comprises a commercially provided and publicly available cellular wireless network and a wireless communication link;

wherein the communication module is a wireless electronic communication device that allows the logic module to wirelessly communicate the logs generated by the control module with the appropriate authority;

wherein the communication module establishes the wireless communication link with the commercially provided and publicly available cellular wireless network;

wherein the communication module communicates logs generated by the control module as SMS and MMS messages between the logic module and the appropriate authority through the commercially provided and publicly available cellular wireless network.

3. The vehicular speed detection and warning system according to claim 2 wherein the GPS module is an electrical device that communicates with the GPS to determine the GPS coordinates of the GPS module;

wherein the GPS module continuously tracks the GPS coordinates and the speed of the vehicle for the logic module;

wherein the GPS module transfers the GPS coordinates to the logic module;

wherein the GPS module transfers the speed of the vehicle to the logic module.

4. The vehicular speed detection and warning system according to claim 3 wherein each of the one or more image sensors is a camera;

wherein each of the one or more image sensors captures images of the road network;

wherein each of the one or more image sensors is configured for use with the logic module.

5. The vehicular speed detection and warning system according to claim 4 wherein the logic module is a programmable electrical circuit;

wherein the logic module controls an operation of the control module;

wherein the logic module monitors the VECU of the vehicle such that the logic module will initiate n operation of the logic module when the VECU indicates that the vehicle has initiated n operation of the vehicle;

wherein the logic module monitors the VECU of the vehicle such that the control module will discontinue the operation of the logic module when the VECU indicates that the vehicle has discontinued the operation of the vehicle;

wherein the logic module receives images of the traffic signs and the traffic signals of the road network from the one or more image sensors to an image processing system;

wherein the logic module processes the captured images of the traffic signs and the traffic signals of the road network to determine the traffic control information presented by the traffic signs and the traffic signals of the road network;

wherein the logic module monitors compliance of the vehicle with the traffic control information presented by the traffic signs and the traffic signals of the road network;

wherein the logic module receives the GPS coordinates and the speed of the vehicle from the GPS module;

wherein the logic module compares the speed of the vehicle against the speed limit indicated by the traffic signs and the traffic signals of the road network;

wherein the logic module generates the visual and audible alert within the vehicle when the speed of the vehicle is greater than the posted speed limit indicated by the traffic control information presented by the traffic signs and the traffic signals of the road network;

wherein the logic module records a log entry containing a code indicating that the vehicle was traveling at an improper speed along with the GPS coordinates of where this violation occurred;

wherein the logic module saves the video file of the image documenting that the vehicle was traveling at an improper speed;

wherein the logic module transmits a message documenting the recorded log entry to the appropriate authority using the communication module;

wherein the logic module generates the visual and audible alert within the vehicle when the vehicle improperly enters an intersection of two or more streets;

wherein the logic module records the log entry containing a code indicating that the vehicle improperly entered an intersection along with the GPS coordinates of where this violation occurred;

wherein the logic module saves the video file of the image documenting that the vehicle improperly entered the intersection;

wherein the control module transmits a message documenting the recorded log entry to the appropriate authority using the communication module.

6. The vehicular speed detection and warning system according to claim 5 wherein the performance log is a data management device; wherein the logic module transmits the code received from the image processing system to the performance log for processing into a message that is sent to the appropriate authority and a log entry that is returned to the logic module;

wherein the logic module transmits the GPS coordinates of the GPS module to the image processing system for processing into the message and the log entry;

wherein the logic module transmits the speed of the vehicle for processing into the message and the log entry.

7. The vehicular speed detection and warning system according to claim 6 wherein the memory device is an electrical device;

wherein the memory device provides long term storage for the log entry and the video file generated by the logic module, the image processing system, and the performance log.

8. The vehicular speed detection and warning system according to claim 7 wherein the display is an electrical device;

wherein the display forms a visual and tactile interface with an operator of the vehicle;

wherein the display presents the visual alerts generated by the control module.

9. The vehicular speed detection and warning system according to claim 8 wherein the speaker is an electrical device;

wherein the speaker is a transducer that converts electrical signals into audible sounds;

wherein the speaker presents the audible alerts generated by the logic module.

10. The vehicular speed detection and warning system according to claim 9 wherein the speaker is an electrical device;

wherein the port is an electrical device;

wherein the port forms an electrical interface that allows the logic module to download the log entries and video files stored in the memory device into an external device.

11. The vehicular speed detection and warning system according to claim 10 wherein the housing further comprises a shell, a rotating mount, and a fastener;

wherein the shell and the fastener attach to the rotating mount;

wherein the fastener attaches the housing to a dash of the vehicle; wherein the shell is a rigid structure;

wherein the shell contains the control module;

wherein the rotating mount is a mechanical device that attaches the control module to the vehicle;

wherein the rotating mount is a rotating device;

wherein a rotation of the rotating mount allows the position of the display of the logic module to be adjusted relative to the operator of the vehicle;

wherein the fastener is a fastening device that secures the rotating mount to the vehicle.

* * * * *